US007111514B2

(12) United States Patent
Hatano et al.

(10) Patent No.: US 7,111,514 B2
(45) Date of Patent: Sep. 26, 2006

(54) ACCELERATION SENSOR

(75) Inventors: Hiroyuki Hatano, Mohka (JP); Shinji Furuichi, Mohka (JP); Masakatsu Saitoh, Yokohama (JP)

(73) Assignee: Hitachi Metals, Ltd., Tokyo (JP)

( * ) Notice: Subject to any disclaimer, the term of this patent is extended or adjusted under 35 U.S.C. 154(b) by 35 days.

(21) Appl. No.: 10/936,809

(22) Filed: Sep. 9, 2004

(65) Prior Publication Data
US 2005/0056093 A1 Mar. 17, 2005

(30) Foreign Application Priority Data
Sep. 16, 2003 (JP) ............................. 2003-322452

(51) Int. Cl.
*G01P 15/12* (2006.01)
*G01P 15/00* (2006.01)
(52) U.S. Cl. ............................... 73/514.33; 73/514.38
(58) Field of Classification Search ............. 73/514.33, 73/514.38, 514.24; 338/2, 5
See application file for complete search history.

(56) References Cited

U.S. PATENT DOCUMENTS

| 4,882,933 | A | * | 11/1989 | Petersen et al. | ......... | 73/514.13 |
| 5,490,421 | A | * | 2/1996 | Ueyanagi | ................. | 73/514.33 |
| 5,895,853 | A | | 4/1999 | Shiota | | |
| 6,892,578 | B1 | * | 5/2005 | Saitoh et al. | ............. | 73/514.33 |
| 6,920,788 | B1 | * | 7/2005 | Okada | ..................... | 73/514.38 |

FOREIGN PATENT DOCUMENTS

| JP | 04-274005 | 9/1992 |
| JP | 05-041148 | 2/1993 |
| JP | 08-233851 | 9/1996 |
| JP | 11160348 | 6/1999 |
| JP | 2003101032 | 4/2003 |
| WO | WO 01/75455 A2 | 10/2001 |
| WO | WO 01/75455 A3 | 10/2001 |

* cited by examiner

*Primary Examiner*—Helen Kwok
(74) *Attorney, Agent, or Firm*—Sughrue Mion, PLLC

(57) ABSTRACT

An acceleration sensor comprises an acceleration sensor element having a mass portion in the center, a thick frame surrounding the mass portion and a plurality of elastic support arms bridging the mass portion and the thick frame, and an upper regulation plate covering the acceleration sensor element and fixed on the thick frame with adhesive. The mass portion has, on the mass portion upper surface, connection portions connecting the mass portion with each of the arms, wired areas having lead wires on it and non-wired areas. The non-wired areas have a major area of the upper surface of the mass portion and are lower than the wired areas. The upper regulation plate has a first gap with the wired areas and a second gap with the non-wired areas, of which length is more than the sum of the first gap length, a lead wire thickness and 0.1 μm (preferably 1.0 μm). Even if contaminants adhere the mass portion upper surface, there is a large possibility of removing the contaminants from the upper surface when etching the non-wired areas, so that the vibration amplitude of the mass portion is scarcely lessened due to them.

9 Claims, 5 Drawing Sheets

ACCELERATION SENSOR

BACKGROUND OF THE INVENTION

1. Field of the Invention

The present invention relates to an acceleration sensor for detecting acceleration, which is used for toys, automobiles, aircrafts, portable terminals and the like, and particularly to an acceleration sensor that can be produced using a semiconductor technology.

2. Description of the Related Art

Acceleration sensors utilizing a change in physical quantity such as a piezo resistance effect and a change in electrostatic capacity have been developed and commercialized. These acceleration sensors can be widely used in various fields, but recently, such small-sized acceleration sensors as can detect the acceleration in multi-axial directions at one time with high sensitivity are demanded.

Since silicon single crystal becomes an ideal elastic body due to the extreme paucity of lattice defect and since a semiconductor process technology can be applied for it without large modification, much attention is paid to a piezo resistance effect type semiconductor acceleration sensor in which a thin elastic support portion is provided at a silicon single crystal substrate, and the stress applied to the thin elastic support portion is converted into an electric signal by a strain gauge, for example, a piezo resistance effect element, to be an output.

As a three-dimensional acceleration sensor, an acceleration sensor has been used, which comprises elastic support arms each of a beam structure formed by a thin portion of a silicon single crystal substrate connecting a mass portion constituted by a thick portion of a silicon single crystal substrate in a center and a frame in its periphery. A plurality of strain gauges are formed in each axial direction on the elastic support arms. In order to sense a small acceleration with an enhanced sensitivity, the elastic support arms are made long and/or thin, or the mass portion that works as a pendulum is made heavy. The acceleration sensor that can detect a small acceleration has led to an excessive amplitude of the mass portion, when subjected to a large impact, and resulted to break the elastic support arms. To avoid the break of the elastic support arms even if a massive impact is applied, regulation plates have been installed above and below the acceleration sensor element to restrict amplitude of the mass portion within a certain range.

An acceleration sensor having regulation plates is described in Japanese Laid-Open Patents HEI 4-274005, HEI 5-41148 and HEI 8-233851.

Japanese Laid-Open Patents HEI 4-274005 and HEI 8-233851 also disclose a method in which, to control a gap at a predetermined value between the regulation plates and the mass portion of the acceleration sensor element, small balls having a diameter of substantially the same distance as a gap are mixed with adhesive, and the adhesive with small balls mixed is used to bond regulation plates to the acceleration sensor element. The gap can be maintained at a predetermined value because the gap between regulation plates and the acceleration sensor element can be dictated by a diameter of small balls. The use of adhesive containing small balls thus enables the control of a gap between regulation plates and the acceleration sensor element.

Acceleration sensors are manufactured by a process comprising: forming a number of acceleration sensor elements on a silicon wafer of about 6 inches in diameter by a photo lithography technology, cutting the wafer into acceleration sensor elements one by one, fixing each of the acceleration sensor elements in a protection case and connecting electrical terminals with conductors, mounting a regulation plate on the acceleration sensor element and fixing a lid of the protection case onto the protection case with adhesive.

The process for manufacturing the acceleration sensor elements from the silicon wafer uses a sputtering apparatus for forming terminals and lead wires on the elements, an ion implantation apparatus for forming piezoresistors, a dry etching apparatus for dry etching the silicon wafer and the like, besides coating and developing photo resistive films and rinsing them. Particularly in the dry etching step, the silicon wafer is fixed onto a dummy substrate with resin adhesive to cool the silicon wafer. Elastic support arms are liable to fracture during removing the resin adhesive after the dry etching step, since they are as thin as 5 to 10 μm, while they are of 500 to 700 μm long and 80 to 120 μm thick. The adhesive cannot be removed by applying a mechanical force but by using a solvent. By the reason, even a small amount of residual adhesive tends to remain on the elements. Also, there may be asperities or protrusions caused on the elements because dust is scattered in the sputtering step of lead wires. Most of the asperities or protrusions (hereafter referred to as "contaminants") caused in the sputtering are less than some μm in height and of soft material so that they do not affect the bending of the elastic support arms nor reduce output voltages and sensitivity of the acceleration sensor, although a side of them is longer than 10 μm. Contaminants caused by sputtering are harder in material than the resin adhesive and as high as 0.1 to 5 μm in height, although they are as large as some μm to 10 μm in a side length of their area. But, the sputtered contaminants do not affect the bending of the elastic support arms. It is thought that the contaminants do not affect the measurement results of acceleration, since they are small in volume and in weight. It was proved that there are no contaminants larger than 5 μm high, when a lot of contaminants were measured in height.

The contaminants cannot be neglected with respect to a gap g between a regulation plate mounted to face an acceleration sensor element and a mass portion on the acceleration sensor element, since the gap is as small as about 15 μm. In view of the height of the contaminants, most of the acceleration sensor elements in which the contaminants adhere a mass portion of the element cannot be used. Because of that, those having contaminants on a surface facing a regulation plate had to be disposed of as a defective product. The contaminants lowered production yields, resulting in raising prices of the acceleration sensors.

In a usual acceleration sensor, a gap between non-wired areas of an upper surface of a mass portion and an upper regulation plate has a length of more by a thickness of lead wires on the acceleration sensor element than that between wired areas of the upper surface of the mass portion and the upper regulation plate. However, since the wire thickness on the sensor element is about 1 μm at most and the contaminants adhering the mass portion are as large as about 5 μm in height, there is an extremely high possibility of the contaminants contacting the upper regulation plate first, when the contaminants adhere any area on the mass portion and when the mass portion is displaced by excessive acceleration, and the output is apt to be saturated even if the applied acceleration is within a measurable range.

SUMMARY OF THE INVENTION

The invention has an object to provide an acceleration sensor without cost increase, which sensor has a wider allowance with respect to contaminants than conventional, while a measurable acceleration range is not narrowed due to the contacts of the contaminants with an upper regulation plate and an impact resistance is not lowered.

An acceleration sensor of the invention comprises an acceleration sensor element and an upper regulation plate mounted on the acceleration sensor element to cover it. The an acceleration sensor element comprises a mass portion located in the center of the acceleration sensor element, a thick frame being at a distance from the mass portion and having a plurality of electrical terminals on an upper surface of the thick frame, a plurality of elastic support arms bridging an upper surface of the mass portion and the upper surface of the thick fame, strain gauges formed on upper surfaces of the elastic support arms and lead wires connecting between the strain gauges and/or between the strain gauges and the electrical terminals. The upper surface of the mass portion is composed of connection portions connecting the mass portion with each of the elastic support arms, wired areas having part of the lead wires on the wired areas, and non-wired areas. The upper regulation plate is mounted with a first gap between the wired areas of the mass portion and a bottom surface of the upper regulation plate and fixed on the upper surface of the thick frame by adhesive put on the upper surface of the thick frame. The upper regulation plate has a second gap between the non-wired areas of the mass portion and the bottom surface of the upper regulation plate. The second gap has a length more than the sum of a length of the first gap, a thickness of the lead wires on the wired areas and 0.1 μm.

In the acceleration sensor of the invention, it is preferable that the second gap has a length more than the sum of the length of the first gap, the lead wire thickness on the wired areas and 1.0 μm. The second gap more preferably has a length more by the sum of the lead wire thickness on the wired areas and a thickness of the connection portions than the length of the first gap.

In the acceleration sensor of the invention, it is preferable that the connection portions have upper surfaces substantially level with the upper surfaces of the elastic support arms, that the wired areas are substantially on a level with the upper surfaces of the elastic support arms except for the lead wires on the wired areas and connect one of the upper surfaces of the connection portions with another upper surface of the connection portions, and that the non-wired areas are lower than a level of the wired areas and the upper surfaces of the connection portions.

In the acceleration sensor of the invention, it is preferable that a thickness of the connection portions is substantially equal to the thickness of the elastic support arms.

DETAILED DESCRIPTION OF THE PREFERRED EMBODIMENTS

Figure 1:
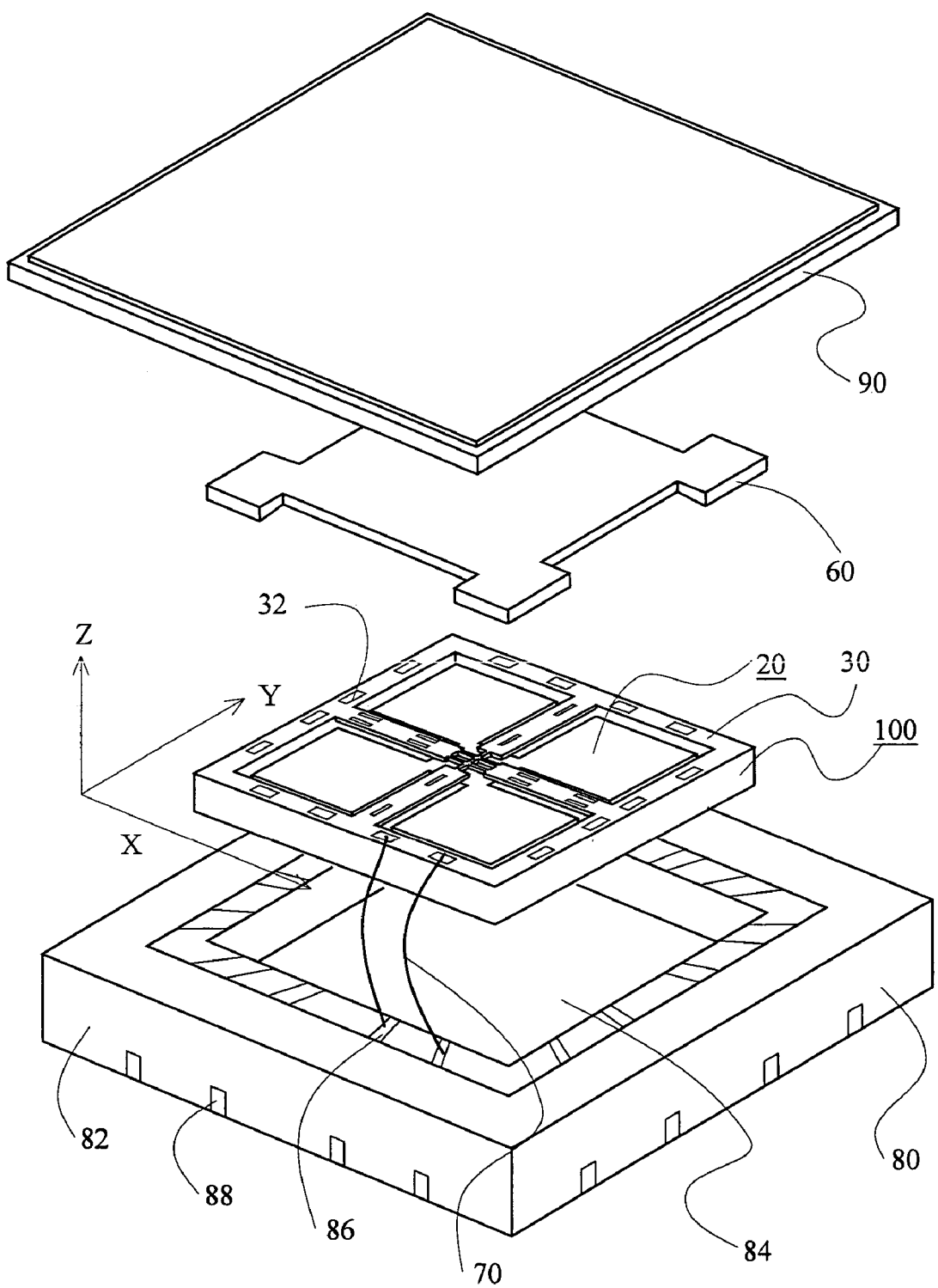
FIG. 1 is an exploded perspective view of an example of an acceleration sensor according to the invention.

An example of an acceleration sensor according to the invention, which is comprised of the acceleration sensor element 100 and the upper regulation plate 60 spaced at a predetermined gap from the acceleration sensor element, is mounted in a protection case 80 made of a material such as alumina, as shown in FIG. 1. A cap 90 made of a material such as alumina is mounted on the top of the protection case 80.

The protection case 80 has a side frame 82 and an inner bottom plate 84, and a bottom surface of the thick frame of the acceleration sensor element 100 is fixedly bonded onto the inner bottom plate 84. When the acceleration sensor element 100 is fixed to the inner bottom plate 84, the mass portion 20 in the center of the acceleration sensor element 100 is not contacted with the bottom plate 84 of the protection case 80 and maintains a predetermined gap, which may have a different length from a gap between the upper surface of the mass portion and the upper regulation plate. The inner bottom plate 84 maintains a gap from a bottom surface of the mass portion 20 and restricts the downward vibration within the gap, acting as a lower regulation plate.

The side frame 82 of the protection case 80 has a plurality of second input/output terminals 86, and each of the first input/output terminals 32 of the acceleration sensor element mounted in the protection case is connected to these second input/output terminals 86 by lead wires 70. Each of the second input/output terminals 86 is in turn connected to a plurality of external terminals 88 provided in side surfaces of the protection case 80 by conductors within the side frame 82. These conductors are not important in the invention and therefore are not shown.

The acceleration sensor 100 for the invention uses a silicon single crystal substrate with an SOI layer being formed via a $SiO_2$ insulation layer, namely, an SOI wafer, in order to make it possible to control the thickness of elastic support arms with high precision. The SOI is an abbreviation of Silicon On Insulator. In this example, a wafer formed by thinly forming the $SiO_2$ insulation layer being an etching stopper (about 1 μm) on a Si wafer with thickness of about 600 μm, on which an N-type silicon single crystal layer with thickness of about 10 μm is formed, is used as a substrate. The acceleration sensor element is constituted by a mass portion 20 in a center, which is constituted by a thick portion of the silicon single crystal substrate; a square-shaped frame 30 placed around the mass portion 20 to surround it; two pairs of beam-shaped elastic support arms 41, 42, 43, 44 that are constituted by thin portions of the silicon single crystal substrate to connect the mass portion 20 and the frame 30, strain gauges (in the following explanation, "piezoresistors" as an example of the strain gauge is used, and therefore they are called "piezoresistors"), four of which are for each axis, and which are placed on the elastic support arms correspondingly to two detection axes (X and Y axes) perpendicular to each other and the detection axis (Z axis) orthogonal to the top surface of the acceleration sensor element. Namely, the two piezoresistors X1, X2, X3, X4 are provided on each of the elastic support arms 41, 42, which extend in the X-axis direction to detect the acceleration in the X-axis direction. The two piezoresistors Y1, Y2, Y3, Y4 are provided on each of the elastic support arms 43, 44, which extend in the Y-axis direction to detect the acceleration in the Y-axis direction. Further two piezoresistors Z1, Z2, Z3, Z4 are provided on each of the elastic support arms 41, 42, which extend in the X-axis direction to detect the acceleration in the Z-axis direction. In this example, the acceleration in the Z-axis direction is detected by the piezoresistors provided on the elastic support arms 41, 42 extending in the X-axis direction, but the elements for detecting the acceleration in the Z-axis direction may be provided on the elastic support arms 43, 44 extending in the Y-axis direction. Four of the piezoresistors for detecting the acceleration in each axis direction construct a full bridge detection circuit.

Figure 2:
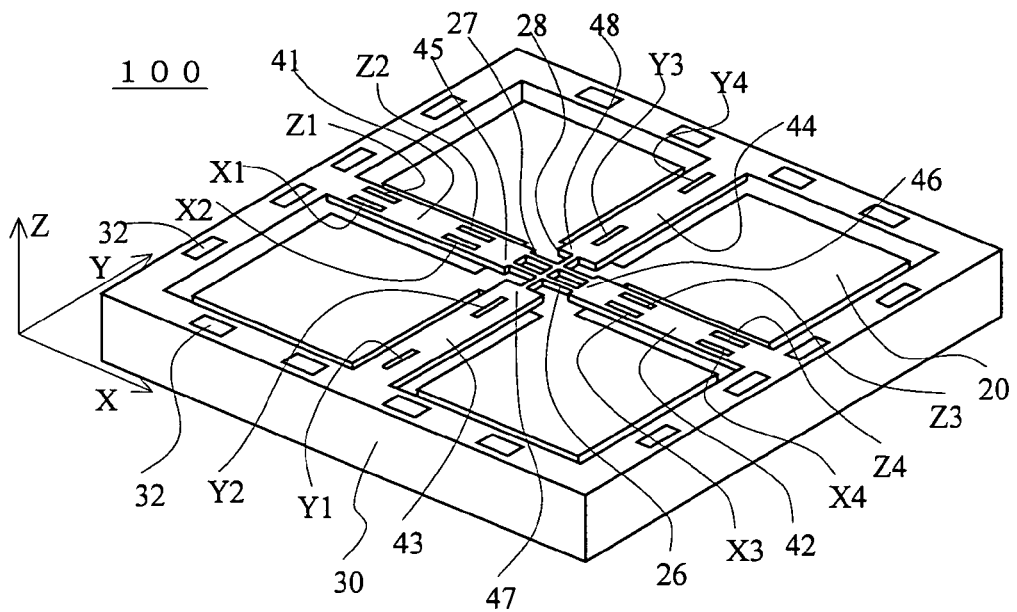
FIG. 2 is a perspective view of an acceleration sensor element used in the example of the acceleration sensor of the invention shown in FIG. 1.
Figure 3:
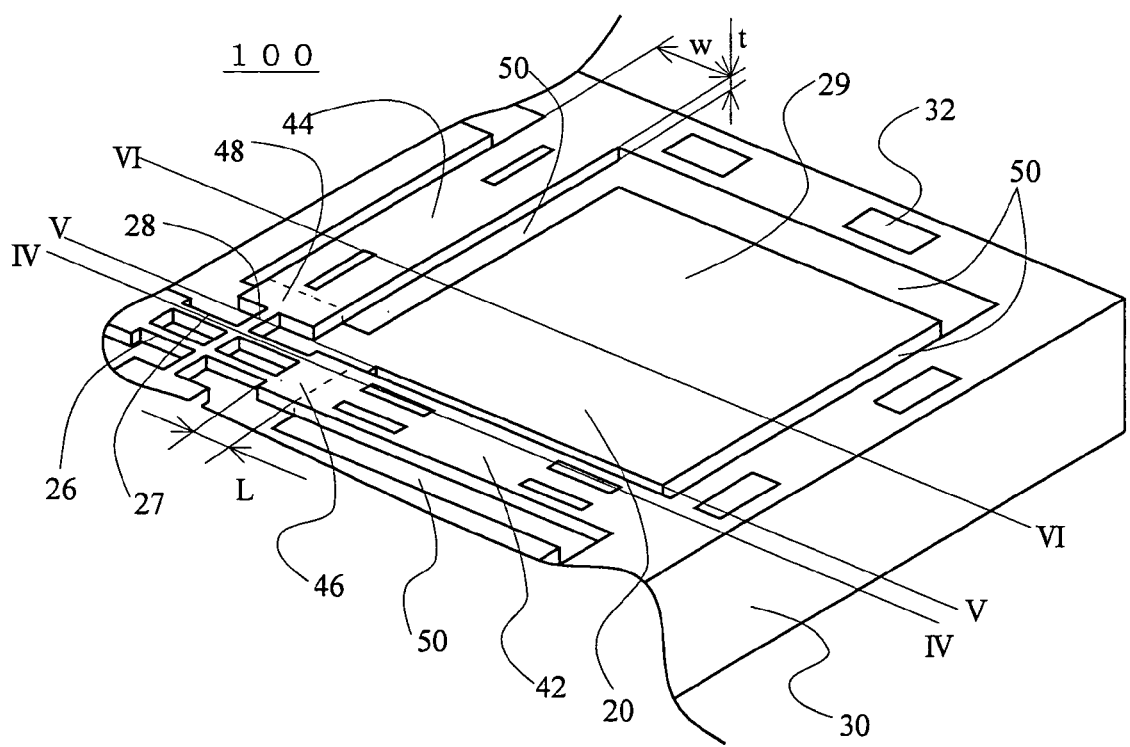
FIG. 3 is a partially enlarged view of the acceleration sensor element shown in FIG. 2.

A plurality of input/output terminals 32 are provided on the upper surface of the thick frame 30 of the acceleration sensor element 100. The input/output terminals 32 are connected to terminals of twelve piezoresistors on the elastic support arms by each of a plurality of conductors provided from the upper surfaces of the elastic support arms to the upper surface of the thick frame. FIGS. 1 through 3 do not show these conductors that connect the input/output terminals 32 to the piezoresistors.

Figure 7A:
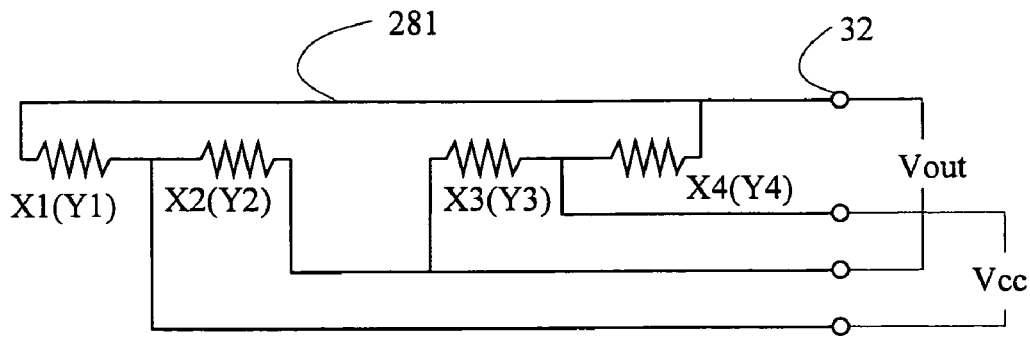
FIG. 7A shows a bridge circuit composed of piezoresistors for detecting acceleration in X-axis (Y-axis) direction.
Figure 7B:
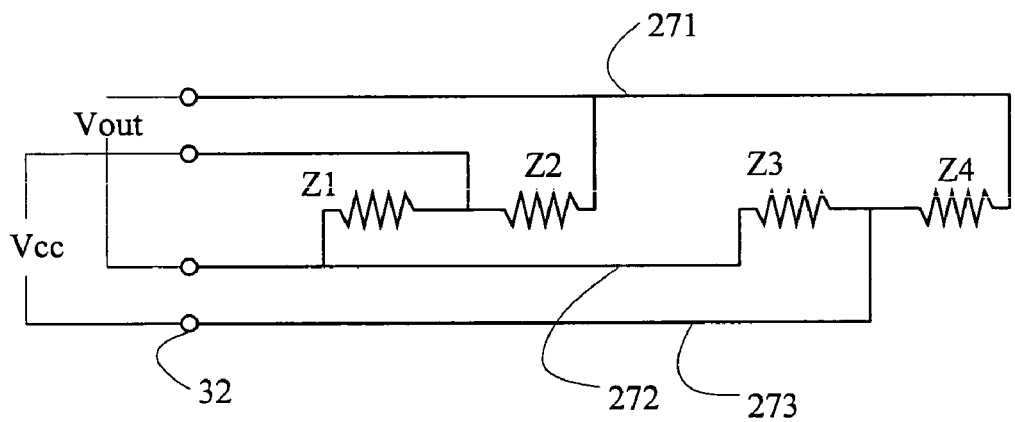
FIG. 7B shows a bridge circuit composed of piezoresistors for detecting acceleration in Z-axis direction.

FIGS. 7A and 7B show examples of full bridge circuits composed of the piezoresistors. On an upper surface of one 41 of the two elastic support arms extending in X-axis direction in FIGS. 1 and 2, the piezoresistors X1 and X2 are formed, while the piezoresistors X3 and X4 are formed on an upper surface of the other elastic support arm 42. Referring to FIG. 7A, a midpoint between the piezoresistors X1 and X2 that are connected in series and a midpoint between the piezoresistors X3 and X4 that are connected in series are connected to each of input terminals 32, respectively, and a measurement voltage Vcc is applied between the two terminals. A left lead wire pulled out from the piezoresistor X1 and a right lead wire pulled out from the piezoresistor X4 in FIG. 7A are connected to an output terminal 32, while a center lead wire pulled out from the piezoresistor X2 and a center lead wire pulled out from the piezoresistors X3 are connected to the other output terminal 32. Most of the lead wires connecting between the piezoresistors and/or between the piezoresistor and the terminal are provided on the upper surfaces of the elastic support arms 41, 42. Three lead wires connecting the left half and the right half of the circuit of FIG. 7A are partially provided on upper surfaces of connection portions 45, 46 and/or a wired area 26, which will be described in detail later.

On the upper surface of one 41 of the two elastic support arms extending in X-axis direction, the piezoresistors Z1 and Z2 are also formed, while the piezoresitors Z3 and Z4 are also formed on the upper surface of the other elastic support arm 42. Referring to FIG. 7B, a midpoint between the piezoresistors Z1 and Z2 connected in series and a midpoint between the piezoresistors Z3 and Z4 connected in series are connected to each of input terminals 32, respectively, and a measurement voltage Vcc is applied between the two terminals. A left lead wire from the piezoresistor Z1 and a left lead wire from the piezoresistor Z3 in FIG. 7B are connected to an output terminal 32, while a right lead wire from the piezoresistor Z2 and a right lead wire from the piezoresistor Z4 are connected to the other terminal. Most of lead wires connecting between the piezoresistors and/or between the piezoresistor and the terminal are provided on the upper surfaces of the elastic support arms 41, 42. Three lead wires connecting the left half and the right half of the circuit in FIG. 7B are partially provided on the upper surfaces of the connection portions 45, 46 and/or a wired area 27, which will be described in detail later.

On an upper surface of one 43 of the two elastic support arms extending in Y-axis direction, the piezoresistors Y1, Y2 for detecting acceleration in Y-axis direction are formed, while the piezoresistors Y3, Y4 for detecting acceleration in Y-axis direction are formed on an upper surface of the other elastic support arm 44. A full bridge circuit composed of the piezoresistors Y1, Y2, Y3, Y4 is also shown in FIG. 7A. Lead wires connecting between the piezoresistors and/or between the piezoresistor and a terminal are formed on the upper surfaces of the elastic support arms 43, 44, upper surfaces of connection portions 47, 48 and a wired area 28.

The piezoresistors and the terminals of the circuits shown in FIGS. 7A and 7B correspond to the piezoresistors and the terminals shown in a structure of the acceleration sensor element 100 in FIGS. 1 to 3.

The mass portion 20 positioned in the center of the acceleration sensor element may be square. In the example shown in FIGS. 1 to 3, the mass portion has a structure in which the square weight in the center has each of four square weights at each of the four corners of the square center weight. The mass portion 20 has connection portions 45, 46, 47, 48 connecting the mass portion and an end of each of the elastic support arms 41, 42, 43, 44, wired areas 26, 27, 28 having lead wires on them, and non-wired areas 29. The non-wired areas 29 occupying most area of the upper surface of the mass portion 20 are preferably lower by a thickness t of the elastic support arms 41, 42, 43, 44 than the upper surfaces of the elastic support arms. That is, the non-wired area are recessed by the thickness t of the elastic support arms 41, 42, 43, 44 from the upper surfaces of the elastic support arms 41, 42, 43, 44 and the upper surface of the thick frame 30. The ends of the elastic support arms 41, 42, 43, 44 overlap part of the non-wired areas 29 and constitute the connection portions 45, 46, 47, 48 connecting between the mass portion 20 and the elastic support arms 41, 42, 43, 44. The connection portions 45, 46, 47, 48 have the same width as a width w of the elastic support arms 41, 42, 43, 44 and a length L, in a longitudinal direction of an elastic support arm, that is, in X-axis direction or Y-axis direction, equal to or more than a thickness of the elastic support arms.

Figure 4:
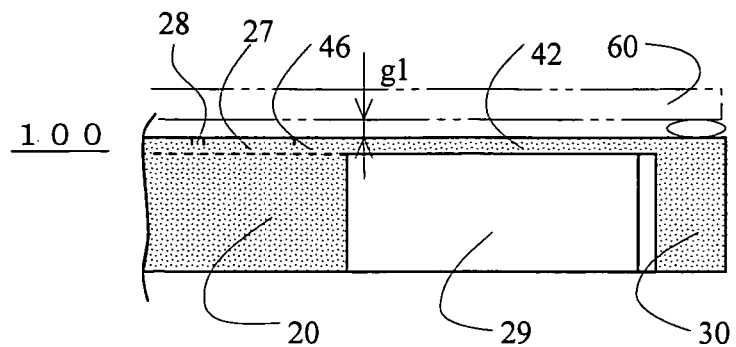
FIG. 4 is a cross-sectional view taken along the line IV—IV in FIG. 3.
Figure 5:
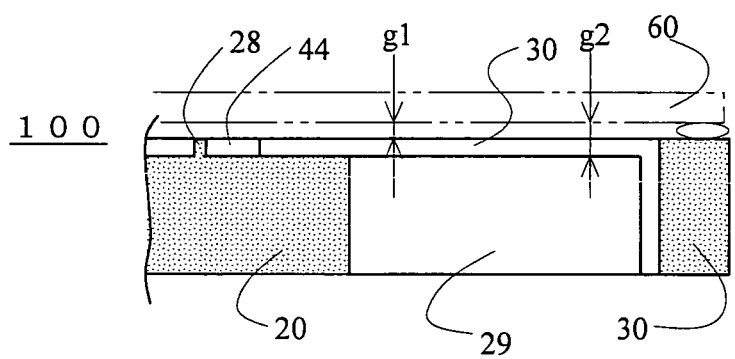
FIG. 5 is a cross-sectional view taken along the line V—V in FIG. 3.
Figure 6:
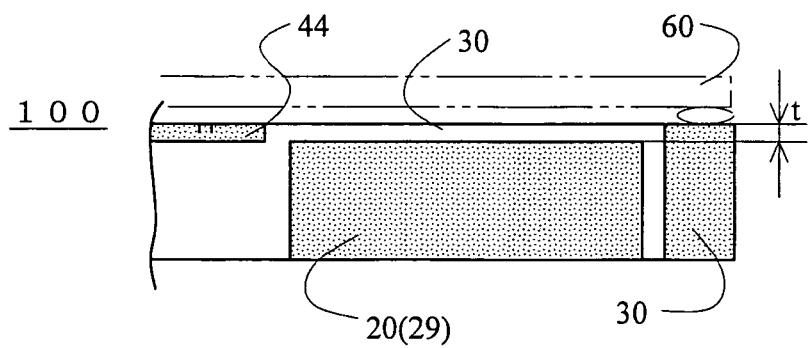
FIG. 6 is a cross-sectional view taken along the line VI—VI in FIG. 3.

In order to show a partially enlarged structure of the acceleration sensor element 100 of FIG. 2, FIG. 4 shows a cross-sectional view taken along the line IV—IV of FIG. 3, FIG. 5 shows a cross-sectional view taken along the line V—V of FIG. 3, and FIG. 6 shows a cross-sectional view taken along the line VI—VI of FIG. 3. As is apparent from FIGS. 4 through 6, the upper surface of the elastic support arm 42 is substantially level with the upper surface of the connection portion 46 and the wired area 27. A bottom of the connection portion 46 at the end of the elastic support arm 42 joins an upper surface of the mass portion 20 and the connection portion 46 connects the mass portion 20 with the elastic support arm 42. The wired area 27 in X-axis direction has an upper surface substantially level with the wired area 28 in Y-axis direction.

Although the non-wired areas 29 are lower by the thickness of the elastic support arms 41, 42, 43, 44 than the upper surfaces of the elastic support arms in the example of the acceleration sensor element, it is useful in the invention that the non-wired areas are a little lower than the upper surfaces of the elastic support arms. The non-wired areas 29 are formed by dry-etching to be lower than the upper surfaces of the elastic support arms 41, 42, 43, 44 and the upper surface of the thick frame. Contaminants adhering the upper surface of the mass portion 20 in a previous process step can be removed by etching the non-wired areas by more than 0.1 µm. It is preferable that the non-wired areas 29 are formed to be more than 1.0 µm deep from the upper surfaces of the elastic support arms 41, 42, 43, 44 by etching. But, it is not desired that the non-wired areas 29 are too deep from the upper surfaces of the elastic support arms 41, 42, 43, 44 and the upper surface of the thick frame 30. Deep etching of the non-wired areas 29 not only needs a long machining time also makes the mass portion 20 light. It is most preferable that the non-wired areas 29 are lower by the thickness t of the elastic support arms than the elastic support arm upper surface, like in the example. The non-wired areas 29 can be machined to be lower by the thickness t of the elastic support arms 41, 42, 43, 44 than the upper surfaces of the elastic support arms by etching the non-wired areas 29 when through-pits 50 between the elastic support arms 41, 42, 43, 44 and the mass portion 20 are dry-etched.

The wired areas 26, 27, 28 have a shape like a ridge rising from the non-wired areas 29, connecting between the elastic support arms 41, 42, 43, 44 on the mass portion 20. That is, they connect between the connection portions 45, 46, 47, 48. The lead wires provided on an upper surface of an elastic support arm (for example, 43) are lead to an upper surface of the other elastic support arm 44 through a wired area 28. The wired area is substantially level with the upper surfaces of the elastic support arms except for lead wires. The lead wires rise a little from the wired areas and also from the upper surfaces of the elastic support arms, and a thickness of the lead wires is at most 1.0 µm on the wired areas.

Figure 8:
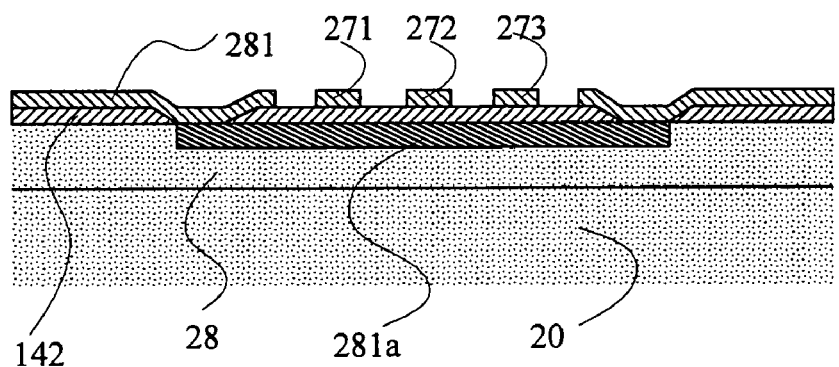
FIG. 8 is a longitudinal cross-sectional view of a wired portion showing crossing wires.

A longitudinal cross-sectional view of a wired portion in Y-axis direction is shown in FIG. 8. In FIG. 8, a Y-axis lead wire 281 is disposed on a wired area 28 on the mass portion 20 via a protection film 142. Z-axis lead wires 271, 272, 273 crossing perpendicularly the Y-axis lead wire 281 are positioned on the protection film 142. Part 281a of the Y-axis lead wire 281 is formed with P+ in which boron is doped into a silicon layer. A lead wire made of the P+ can cross another lead wire without increase of the lead wire thickness.

The upper regulation plate 60 is mounted to cover the upper surface of the acceleration sensor element 100. A gap, for example a gap g1 of 5 to 15 µm, is provided between the bottom surface of the upper regulation plate 60 and the wired areas of the upper surface of the mass portion 20 of the acceleration sensor element 100. At each corner of the upper surface of the thick frame 30 of the acceleration sensor element 100, which is a square thick frame in this embodiment, a paste is provided to fix the upper regulation plate 60 onto the acceleration sensor element 100

A gap between the bottom surface of the upper regulation plate 60 and the non-wired areas of the mass portion 20 of the acceleration sensor element 100 is referred to as a second gap (g2) in the invention. The second gap (g2) is the sum of the first gap (g1), the lead wire thickness and a height difference of the non-wired areas from the wired areas substantially level with the upper surfaces of the elastic support arms. In the example, since the non-wired areas are lower by the connection portion thickness than the wired areas, the second gap (g2) is bigger by the sum of the lead wire thickness and the connection portion thickness than the first gap (g1). But, it is useful in the invention that the non-wired areas are more than 0.1 µm low from the wired areas, preferably more than 1.0 µm low. The second gap (g2) has a length longer than the sum of the first gap (g1), the lead wire thickness and 0.1 µm, preferably 1.0 µm.

If a contaminant adheres the upper surface of the mass portion, the gap between the bottom surface of the upper regulation plate and the upper surface of the mass portion decreases by a height of the contaminant and a vibration amplitude of the mass portion reduces by the height. The contaminants include residual adhesive and those caused by sputtering.

When an acceleration sensor element is made from a silicon wafer, the silicon wafer is fixed onto a dummy substrate with adhesive for dry-etching the acceleration sensor element, facing an upper surface of the acceleration sensor element to the dummy substrate. After dry-etching, the adhesive is removed by a solvent, because the elastic support arms are extremely thin as 5 to 10 µm so that the adhesive cannot be removed by applying a mechanical force, such as ultrasonic rinsing. By the reason, a very small amount of adhesive is left on the upper surface of the mass portion after the removal of the adhesive. The residual adhesive becomes a contaminant. Most of the residual adhesive has a side longer than 10 µm but a height less than some µm. By contrast, the contaminants caused by sputtering are hard and have a side of some µm to 10 µm with a small area but a height of 0.1 to 5 µm.

Since the non-wired areas 29 occupy most area of the upper surface of the mass portion 20, in the acceleration sensor according to the invention, almost the contaminants adhering the non-wired areas can be removed by dry-etching the non-wired areas a little from the wired areas. And even if a contaminant of 5 µm high is left on a non-wired area after etching, the left contaminant does not decrease the gap (g1) between the bottom surface of the upper regulation plate and the upper surface of the mass portion if the non-wired area is lowered by the thickness of the elastic support arms, that is, the connection portion thickness from the wired areas.

The paste used here contains on the order of 10 mass % of the hard plastic balls having diameters of approximately 15 µm. The hard plastic balls are made of a divinylbenzene-based cross-linked copolymer, and may be commercially available products for regulating gaps in liquid crystal displays. A ball with a nominal diameter of 15 µm is highly precise; an average particle diameter is 15 µm±0.1 µm, and the standard deviation of the diameter is 0.6 µm.

The paste contains adhesive that remains elastic even after hardened. Silicon-rubber resin adhesive such as DA6501 from Dow Corning Toray Silicone Co., Ltd. may preferably be used as adhesive. The silicon-rubber resin adhesive is sufficiently elastic, having Young's Modulus less than $8.8 \times 10^{-4}$ G Pa after hardened. Since such adhesive that remains elastic even after hardened is thus used to fix the upper regulation plate to the acceleration sensor chip, the acceleration sensor chip will not be subject to a large stress after the adhesive is hardened.

In an acceleration sensor of the invention, the same paste as one used to fix the upper regulation plate 60 to the upper surface of the thick frame is used as the paste for fixing the lower surface of the thick frame 30 of the acceleration sensor element 100 onto the inner bottom plate 84 of the protection case 80. Since the paste contains hard plastic balls, a gap having the same distance as the diameters of the hard plastic balls or wider distance by the thickness of adhesive may be formed between the lower surface of the mass portion and the inner bottom plate. It is advantageous to use the same paste for both fixing the upper regulation plate to the acceleration sensor element, and the acceleration element into the protection case in view of workability. Other adhesive such as epoxy adhesive may, however, be used for fixing the lower surface of the thick frame of the acceleration sensor element to the inner bottom plate, given that the adhesion area is less likely to affect the sensitivity of the acceleration element.

The upper regulation plate may be made of borosilicate glass and the like in the invention. The linear thermal expansion coefficient of borosilicate glass is approximately $7 \times 10^{-6}$, which is larger than that of silicon, i.e. $2.4 \times 10^{-6}$. The use of adhesive having a small hardness after it is hardened, however, enables the use of a material having such a large linear expansion coefficient for the upper regulation plate.

The size of the acceleration sensor chip will now be described. The length of a side of the square acceleration sensor element 100 is approximately 3300 μm, and the thick frame 30 has a thickness of 600 μm and a width of 450 μm. The mass portion 20 in the center has a side of approximately 1000 μm in length, and a thickness of 600 μm. Four elastic support arms 41, 42, 43, 44 have a length of 700 μm and a width of 110 μm, and are made of silicon on $SiO_2$ insulation layer, which has a thickness of approximately 10 μm.

A production method of the acceleration sensor element 100 will be explained below. FIGS. 9A through 9F show part (right half) of a section in the X-axis direction (IV—IV section) in FIG. 3 to explain a main process. As described above, an SOI wafer is a Si single crystal substrate constructed with a Si base substrate 120, an SOI layer 140 on the top surface, which is a Si active layer, and a $SiO_2$ layer 130, which is between the Si base substrate 120 and the SOI layer 140, and is used as an etching stopper, as denoted by reference numerals in FIG. 9A. As for the thickness thereof, the base substrate 120 has thickness of 600 μm, $SiO_2$ layer has thickness of 1 μm and the SOI layer has thickness of about 10 μm.

Figure 9A:
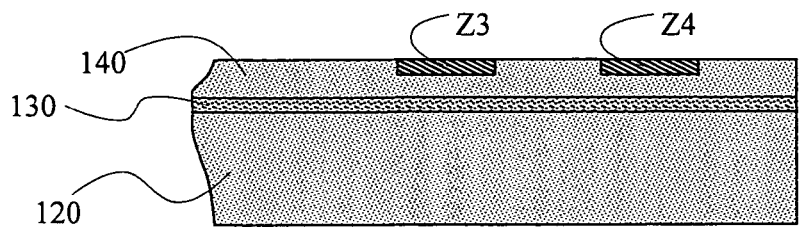
FIGS. 9A to 9F are explanatory views showing a manufacturing process of the acceleration sensor element for the invention.

The first step of the production process is to make a pattern of a predetermined form with a photo-resist or thermally oxidized $SiO_2$ film or the like on the surface of the SOI layer 140 and to make piezoresistors Z3 and Z4 with boron being diffused by an impurity diffusion process such as ion implantation (FIG. 9A). As surface impurity density, about $2 \times 10^{18}$ atoms/$cm^3$ is adopted, from the viewpoint of both the temperature characteristics and sensitivity, while boron concentration for P+ layer formed for conductors shown as 281a in FIG. 8 is made thicker than that for the piezoresistors.

Figure 9B:
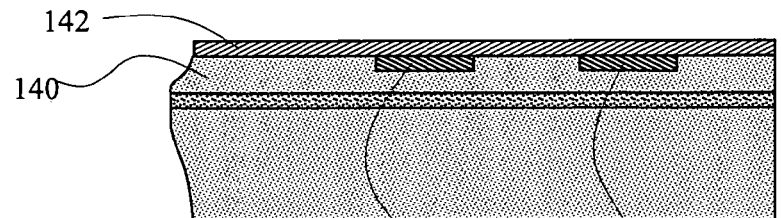

Next, to protect the piezoresistors Z3 and Z4, a protection film 142 is produced (FIG. 9B). As the protection film 142, a multi-layer film of $SiO_2$ and PSG (Phosphorous silicated glass) that are generally used in a semiconductor technology are used to have a gettering effect of movable ion. Instead of the two-layer film of $SiO_2$ and PSG, a two-layer film of $SiO_2$ and SiN may be used. It is preferable that the thickness of the protection film 142 is made as thin as possible to decrease stress in terms of high sensitivity, and therefore it is made 0.3 μm to 0.5 μm.

Figure 9C:
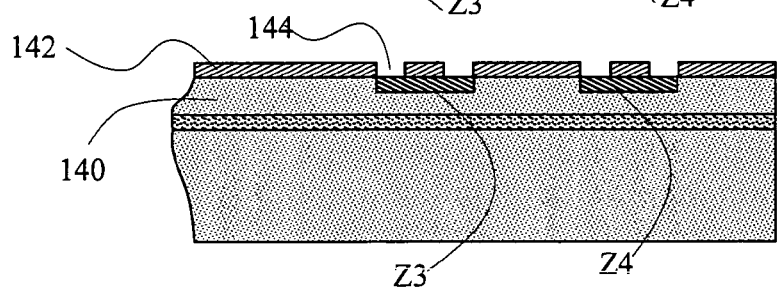

Next, through-holes 144 for connecting conductors are formed in the protection film 142 on both ends of the piezoresistors Z3 and Z4 by a wet etching with hydrofluoric acid as a predominant ingredient (FIG. 9C).

Figure 9D:
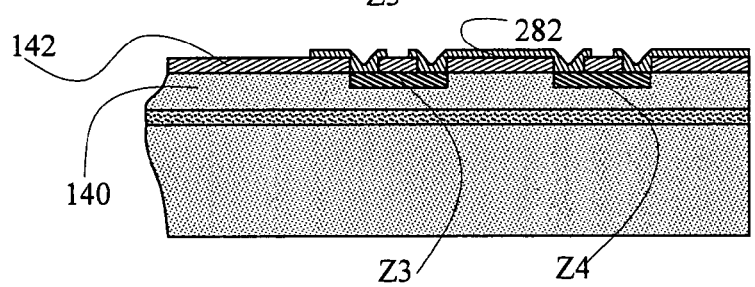
Figure 9E:
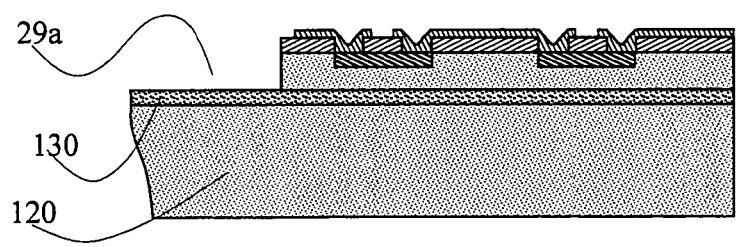

Next, to make lead wires, an aluminum film is formed by sputtering. The thickness is 0.3 μm to 0.5 μm. Lead wires 282 are formed by photo-etching (FIG. 9D). A thickness in total of the protection film 142 and the lead wires 282 formed on the SOI layer is made about 0.6 μm to about 1.0 μm.

Next, though not shown, a photo resist mask having shapes of the thick frame, elastic support arms and connection portions and wired areas of a mass portion is formed on the SOI layer 140, and the SOI layer 140 is etched by a dry etching to reach the $SiO_2$ layer 130, removing through-pits 50 and non-wired areas 29a of the mass portion 20 by the thickness of the SOI layer. Since the $SiO_2$ layer 130 works as an etching stopper of the dry etching, only the silicon layer is etched (See FIG. 9E).

Figure 9F:
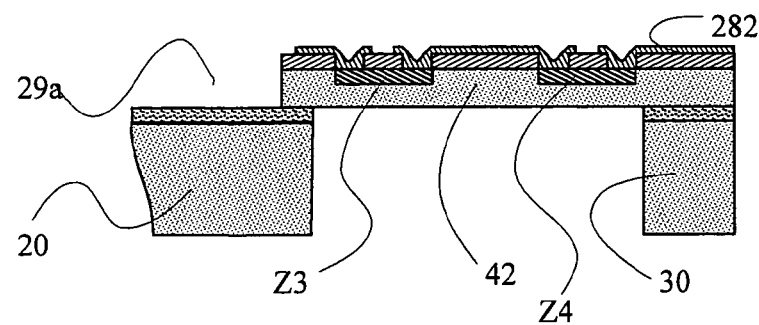

Next, the SOI wafer is set to face a surface of the wafer with the piezoresistors to a dummy substrate and fixed on the dummy substrate with a resin adhesive (not shown). It is necessary to cool the SOI wafer when the silicon base substrate 120 of about 600 μm thick of the SOI wafer is dry etched since the dry etching is performed in plasma with $SF_6$-gas and oxygen. On the base substrate 120 on the back surface a photo-resist mask is formed in the shapes of the mass portion 20 and the frame 30 with the positions of the piezoresistors Z3 and Z4 on the surface, the through-pit pattern 50 of the SOI layer 140 are aligned with use of a double-side aligner device, the base substrate 120 is etched by the dry etching method, and the $SiO_2$ layer 130 as the etching stopper is removed by wet etching with buffered hydrofluoric acid (FIG. 9F).

Thereafter, a number of acceleration sensor elements formed on the wafer are cut into sensor chips one by one with use of a dicer or the like, and each of the acceleration elements is recovered from the dummy substrate by resolving the resin adhesive with a solvent. Through the assembly process such as packaging and the like, the semiconductor acceleration sensor is completed.

EXPERIMENTS

For the experiments, acceleration sensor elements having the same structure as the acceleration sensor discussed in the above example were prepared with the exceptions that the length L of the connection portions connecting the elastic support arms with the mass portion was 7 μm, that the first gap length (g1) between the bottom surface of the upper regulation plate and the upper surface of the mass portion, that is, the upper surfaces of the lead wires was 14 μm, and that the non-wired areas were 1 μm to 13 μm lower than the upper surfaces of the elastic support arms. That is, 2,800 pieces of the acceleration sensor elements were manufactured for each Sample group of 1 μm (Sample B), 3 μm (Sample C), 5 μm (Sample D), 7 μm (Sample E), 10 μm (Sample F) and 13 μm (Sample G) for height difference between the non-wired areas and the upper surfaces of the elastic support arms. Also, for comparison, 2,800 pieces of the acceleration sensor elements (Sample A) were prepared which had no height difference between them. In these acceleration sensor elements, the second gaps (g2) were 15 μm for Sample A, 16 μm for Sample B, 18 μm for Sample C, 20 μm for Sample D, 22 μm for Sample E, 25 μm for Sample F and 28 μm for Sample G, because the first gap (g1) was set to be 14 μm and lead wire thickness was 1 μm.

Occurrence frequencies of contaminants were studied for each of the seven kinds of the acceleration sensor elements with varied heights of the non-wired areas. For comparative Sample A, 824 of 2,800 acceleration sensor elements had at least one contaminant on the upper surfaces of the elastic support arms or the mass portion, and the occurrence frequency ratio was about 30% to the whole elements. For each Sample group of Samples B through G in which the non-wired areas were even a little lowered, there were about 300 elements having at least one contaminant on the upper surfaces of the elastic support arms or the mass portion. It is considered that most of the contaminants occurred on the non-wired areas in the sputtering step were melted off or dropped off during a dry-etching step by the dry-etching of the non-wired areas. About 150 among the acceleration sensor elements with contaminants had the contaminants either on lead wires on the elastic support arms or the mass portion or on the connection portions of the mass portion. Studying the contaminants adhering either the lead wires or the connection portions, it was found that they were 2 to 100 μm in width and/or in length and 0.1 to 5 μm in height. The number of defect products, that had been 824 in the past, was reduced to about 300 by dry-etching the non-wired areas. Since contaminants adhering the non-wired areas can be permitted, when the height difference between the non-wired areas and the upper surfaces of the elastic support arms is made larger than the contaminant height, it is understood that the defect element number can be reduced to about 150. The production yields of the acceleration sensor elements with respect to contaminants were improved to about 90% by dry-etching the non-wired areas and further to about 95% by lowering the non-wired areas than the contaminant height, comparing with a conventional production yield of about 70%.

Acceleration sensor elements having contaminants only on the non-wired areas were selected from the acceleration sensor elements of Samples A through G, and 100 acceleration sensors were manufactured from each of the Sample groups. In the sensors, a gap between a bottom of the mass portion and an inner bottom plate of the protection case was made 19 μm. The upper regulation plate was made of a blue glass plate of 150 μm thick.

Output voltages and noise levels were measured when accelerations of 5 G, 10 G and 30 G were applied to the acceleration sensors, and then, impact resistances of the acceleration sensors were measured after each of the acceleration sensors was freely dropped down to a wooden plate of 100 mm thick from a height of 1 m. The dropping from the height gives impacts of about 1,500 G to 2,000 G to the acceleration sensors. Acceleration sensors having output voltages and noise levels within specification ranges when the acceleration was applied were judged as "passed" products. The impact resistance was evaluated whether output voltages could be measured after the drop tests. Acceleration sensors that do not give output voltages were judged as "defect" products, while acceleration sensors with output voltages were judged as "passed". The test results are shown in TABLE 1.

TABLE 1

| Sample | g2 (μm) | Height Difference b/w Non-wired Areas and Elastic Support Arms | Number of Passed Products/100 | | | Output after Drop Test |
|---|---|---|---|---|---|---|
| | | | Output and Noise Level | | | |
| | | | Acceleration 5 G | Acceleration 10 G | Acceleration 20 G | |
| A | 15 | 0 | 100 | 80 | 64 | 100 |
| B | 16 | 1 | 100 | 95 | 88 | 100 |
| C | 18 | 3 | 100 | 98 | 91 | 100 |
| D | 20 | 5 | 100 | 100 | 100 | 100 |
| E | 22 | 7 | 100 | 100 | 100 | 100 |
| F | 25 | 10 | 100 | 100 | 100 | 99 |
| G | 28 | 13 | 100 | 100 | 100 | 99 |

TABLE 1 shows the number of passed products for 100 tested sensors in each test. From comparative examples, Sample A, for the output voltages and noise level, 20% was defect products for acceleration 10 G, and 36% was defect products for acceleration 20 G. For Sample B, the defect ratio increases when the applied acceleration was raised, but decreases by 24% at acceleration 20 G, comparing to the comparative examples. Only by lowering the non-wired areas by 1 μm, the defect ratio of the acceleration sensors can be improved by 24% and the lowering by 1 μm of the non-wired areas proves to be effective for production yields. As in the same manner, in Sample C the defect ratio decreases by 27% for 20 G. In Sample D with non-wired areas lower by 5 μm, there was no defect product found for acceleration 20 G. Since the maximum height of the contaminants adhering was 5 μm, contact of the contaminants with the regulation plate was avoided with the allowance of the lead wire thickness, 1 μm. For Samples E and G with g2 larger than that of Sample D, there was no defect product. From the fact, in acceleration sensors having the second gaps (g2) equal to those of Samples D through G, that is, with non-wired areas of more than 5 μm low from wired areas, the production yields of acceleration sensors could be greatly increased. But, since Samples D, F and G require other machining steps than the machining step of elastic support arms to lower the non-wired areas, the increase of the machining cost of the acceleration sensors, compared with those for Sample E of the most preferable in the invention, cannot be avoided. It is apparent from this reason that the recess depth of the non-wired areas is advantageously equal to the thickness of elastic support arms.

TABLE 1 also includes the results of the impact resistance test in which acceleration sensors were freely dropped down on a plate of 100 mm thick from a 100 m height. A defect product occurred for each of Samples F and G, in which non-wired areas were recessed by 10 μm and 13 μm, respectively. Since the non-wired areas for Samples F and G were lowered by 10 μm and 13 μm, respectively, from the surfaces of the elastic support arms, that is, the lowered amounts were more than the elastic support arm thickness, the connection portions of the acceleration sensors seem to have been destroyed by forces in X or Y direction (in a longitudinal direction of elastic support arms) applied to the acceleration sensors. But, connection portions perpendicular to the destroyed connection portions were not destroyed. From the fact, it is understood to be important for increasing the impact resistance that the length of the connection portions in a longitudinal direction of the elastic support arms is made longer than the elastic support arm thickness.

As explained above, by lowering the non-wired areas of the mass portion from the wired areas of the mass portion to make the gap between the upper regulation plate and the non-wired areas larger than the gap between the upper regulation plate and the lead wires, the influences to the acceleration sensor properties of the contaminants adhering surfaces of the acceleration sensor element facing the upper regulation plate can be avoided and the production yields were greatly increased. By a difference between the gap (g2) of the non-wired areas of the mass portion with the upper regulation plate and the gap (g1) of the lead wires with the upper regulation plate being equal to the sum of the elastic support arm thickness and the lead wire thickness, the non-wired areas can be simultaneously machined with the machining of the elastic support arms. Also, impact resistivity enough for the dropping test can be obtained. As explained above, high-reliable acceleration sensors can be supplied with low prices by the invention.

What is claimed is:

1. An acceleration sensor comprising:
   an acceleration sensor element having
   a mass portion located in the center of the acceleration sensor element,
   a thick frame being at a distance from the mass portion and having a plurality of terminals on an upper surface of the thick frame,
   a plurality of elastic support arms bridging an upper surface of the mass portion and the upper surface of the thick frame,
   strain gauges formed on upper surfaces of the elastic support arms and
   lead wires connecting between the strain gauges and/or between the strain gauges and the terminals;
   the upper surface of the mass portion composed of:
   connection portions connecting the mass portion with each of the elastic support arms,
   wired areas having part of the lead wires on the wired areas and
   non-wired areas; and
   an upper regulation plate mounted with a first gap between the wired areas of the mass portion and a bottom surface of the upper regulation plate to cover the acceleration sensor element and fixed on the upper surface of the thick frame with adhesive put on the upper surface of the thick frame,
   wherein the upper regulation plate has a second gap between upper surfaces of the non-wired areas of the mass portion and the bottom surface of the upper regulation plate, the second gap separating the upper surfaces of the non-wired areas of the mass portion and the bottom surface of the upper regulation plate, where the separating is at a distance between the upper surfaces of the non-wired areas of the mass portion and the bottom surface of the upper regulation plate which is greater than the sum of (i) a length of the first gap plus (ii) a thickness of the lead wires plus (iii) 0.1 μm.

2. An acceleration sensor as set forth in claim 1, wherein the separating is at a distance between the upper surfaces of the non-wired areas of the mass portion and the bottom surface of the upper regulation plate which is greater than the sum of (i) a length of the first gap plus (ii) a thickness of the lead wires plus (iii) plus 1 μm.

3. An acceleration sensor as set forth in claim 1, wherein the second gap has a length more by the sum of the lead wire thickness on the wired areas and a thickness of the connection portions than the length of the first gap.

4. An acceleration sensor as set forth in claim 1, wherein the connection portions have upper surfaces substantially level with the upper surfaces of the elastic support arms,
   wherein the wired areas are substantially on a level with the upper surfaces of the elastic support arms except for the lead wires and connect one of the upper surfaces of the connection portions with another upper surface of the connection portions, and
   wherein the non-wired areas are lower than a level of the wired areas and the upper surfaces of the connection portions.

5. An acceleration sensor as set forth in claim 2, wherein the connection portions have upper surfaces substantially level with the upper surfaces of the elastic support arms,
   wherein the wired areas are substantially on a level with the upper surfaces of the elastic support arms except for the lead wires and connect one of the upper surfaces of the connection portions with another upper surface of the connection portions, and
   wherein the non-wired areas are lower than a level of the wired areas and the upper surfaces of the connection portions.

6. An acceleration sensor as set forth in claim 3, wherein the connection portions have upper surfaces substantially level with the upper surfaces of the elastic support arms,
   wherein the wired areas are substantially on a level with the upper surfaces of the elastic support arms except for the lead wires and connect one of the upper surfaces of the connection portions with another upper surface of the connection portions, and
   wherein the non-wired areas are lower than a level of the wired areas and the upper surfaces of the connection portions.

7. An acceleration sensor as set forth in claim 4, wherein a thickness of the connection portions is substantially equal to the thickness of the elastic support arms.

8. An acceleration sensor as set forth in claim 5, wherein a thickness of the connection portions is substantially equal to the thickness of the elastic support arms.

9. An acceleration sensor as set forth in claim 6, wherein a thickness of the connection portions is substantially equal to the thickness of the elastic support arms.

* * * * *